(12) United States Patent
Fujiwara

(10) Patent No.: US 6,511,000 B2
(45) Date of Patent: Jan. 28, 2003

(54) ROTARY VALVE TO FEED ARTIFICIAL SNOW AT CONSTANT RATE

(75) Inventor: Takamasa Fujiwara, Hiroshima (JP)

(73) Assignee: Koyo Industry Co., Ltd., Hiroshima (JP)

( * ) Notice: Subject to any disclaimer, the term of this patent is extended or adjusted under 35 U.S.C. 154(b) by 2 days.

(21) Appl. No.: 09/835,624

(22) Filed: Apr. 17, 2001

(65) Prior Publication Data

US 2001/0043862 A1 Nov. 22, 2001

(30) Foreign Application Priority Data

May 17, 2000 (JP) ........................................ 2000-145381

(51) Int. Cl.$^7$ ................................................ F25C 3/04
(52) U.S. Cl. ...................... 239/14.2; 239/128; 239/135; 239/654; 239/689
(58) Field of Search ................................ 239/2.2, 14.2, 239/128, 132, 135, 650, 654, 689; 62/72, 74, 79, 347, 320; 241/191, 195, DIG. 17

(56) References Cited

U.S. PATENT DOCUMENTS

| | | | | |
|---|---|---|---|---|
| 4,385,729 A | * | 5/1983 | Wiederkehr | ................. 239/689 |
| 4,798,331 A | * | 1/1989 | Suga | ......................... 239/14.2 |
| 5,062,279 A | * | 11/1991 | Kawashima et al. | ....... 239/14.2 |
| 5,297,731 A | * | 3/1994 | Bucceri | .................... 239/14.2 |

FOREIGN PATENT DOCUMENTS

| | | |
|---|---|---|
| DE | 26 06 483 | 8/1976 |
| DE | 29 03 323 | 8/1980 |
| DE | 94 08 383 | 9/1994 |
| EP | 0 945 694 | 3/1999 |
| FR | 2 573 527 | 5/1986 |
| GB | 1055578 | 1/1967 |
| JP | 5-312449 | 11/1993 |
| JP | 11-116053 | 4/1999 |

OTHER PUBLICATIONS

Copy of European Patent Office Search Report for corresponding European Patent Application No. 01 20 1734 dated Aug. 21, 2001.

* cited by examiner

Primary Examiner—Steven J. Ganey
(74) Attorney, Agent, or Firm—Armstrong, Westerman & Hattori, LLP

(57) ABSTRACT

An apparatus preventing adhesion, growth and freezing of ice pieces, which tend to happen with quality artificial snow such as fine flake snow and powder snow. The rotary valve 1 to feed artificial snow at a constant rate includes: impeller rotary shaft 3 which is placed in cylindrical casing 2 along the length direction of the cylinder; a plurality of impellers 4 which are arranged around impeller rotary shaft 3 at an equal distance from each other in the radial direction; opening 25 for loading of artificial snow which connects the top portion of a wall of cylindrical casing 2 with the top portion of a housing; opening 7 for receiving compressed air which is formed on casing side wall 6 to receive said compressed air from a blower; and an exit 10 for artificial snow formed at the other casing side wall 9 to blow out artificial snow, cut in a given amount, with compressed air. The impeller 4 is connected with the adjacent impeller at its end contacting impeller rotary shaft 3 by a smooth surface of arched plate 14 having arc 15. The opening 7 for loading of artificial snow on casing side wall 6 and the exit 10 for artificial snow on the other casing side wall 9 are arranged across from each other in arc 15 between impellers 4.

7 Claims, 8 Drawing Sheets

ROTARY VALVE TO FEED ARTIFICIAL SNOW AT CONSTANT RATE

BACKGROUND OF THE INVENTION

1. Field of the Invention

The present invention relates to an apparatus to feed artificial snow to an artificial snow making device at a constant rate to precipitate artificial snow on a ski slope.

2. Description of the Invention

An artificial snow making device to precipitate artificial snow conventionally blows out artificial snow by using the centrifugal force of rotating impellers. Kinds of artificial snow mainly include: 1) plate snow; 2) flake snow; and 3) powder snow. In the case of 1) plate snow, the ice pieces are relatively large such that they do not adhere to a feeder while being fed into the artificial snow making device. However, as the size of the ice pieces becomes smaller from 2) flake snow to 3) powder snow, it tends to adhere to the feeder. The adhered ice pieces gradually grow larger and freeze such that the feeder eventually stops functioning.

Impellers 4 of a conventional artificial snow blower or a rotary valve of a feeder are formed around impeller rotary shaft 3 in the radial direction. As shown in FIG. 8, the bottoms of impeller 4 contacting impeller rotary shaft 3 form corner portions 26 at an approximately right angle. Corner portions 26 hardly catch large ice pieces 27 while fine ice pieces 27 tend to adhere thereto. As mentioned above, the adhered ice pieces grow and freeze into lumps of ice pieces 27. The lumps cause additional load to impellers 4 such that additional drive is required to maintain the rotation of impellers 4. Further, the operating surfaces of impellers 4 are reduced such that the performance is deteriorated. Finally, the entire device is frozen and stops. A skiing population prefers natural snow such as 2) flake snow or 3) powder snow such that this type of trouble is inevitable.

SUMMARY OF THE INVENTION

The present invention provides an apparatus which does not cause adhesion, growth and freezing of ice pieces, which tend to happen with quality artificial snow such as fine flake snow and powder snow, in a rotary valve as an artificial snow feeder at a constant rate.

To solve the above issue, according to the a first aspect, the present invention provides a rotary valve 1 to feed artificial snow at a constant rate, which includes:

cylindrical casing 2;

impeller rotary shaft 3 which is placed in cylindrical casing 2 in the length direction of the cylinder;

a plurality of impellers 4 which are arranged around impeller rotary shaft 3 at an equal distance from each other in the radial direction;

housing 24 which supports cylindrical casing 2 therein;

opening 25 for loading of artificial snow which connects the top portion of a wall of cylindrical casing 2 with the top portion of housing 24;

opening 7 for receiving compressed air which is formed on the side wall 6 of casing 2 at one end 5 of impeller rotary shaft 3 to receive said compressed air from a blower; and exit 10 for artificial snow formed at the other end 8 of the casing side wall 9 to blow out artificial snow cut in a given amount with compressed air, wherein the diameter 11 of impeller rotary shaft 3 is established to be about one half of the diameter 12 of cylindrical casing 2, impeller 4 is connected with the adjacent impeller at its end contacting impeller rotary shaft 3 by a smooth surface of arched plate 14 having arc 15, and an opening 7 for receiving compressed air on casing side wall 6 and an exit 10 for artificial snow on the other casing side wall 9 are arranged across from each other in arc 15 between impellers 4.

According to a second aspect, the present invention provides a rotary valve 1 to feed artificial snow at a constant rate in relation to the first aspect in which arched plate 14 having arc 15 is covered by coating layer 29 of a lubricating resin.

According to a third aspect, the present invention provides a rotary valve 1 to feed artificial snow at a constant rate in relation to the first and second aspect in which:

spaces on sides of impeller 4 between arched plate 14 having arc 15 and impeller rotary shaft 3 are hollow portions 16;

heater hole 17 is provided such that a heater is placed at the center of impeller rotary shaft 3 in the axial direction; and heater hole 17 and each hollow portion 16 are connected via a plurality of thermal convection holes 18 which are formed in the radial direction to send the heat from heater hole 17 to each hollow portion 16.

According to a fourth aspect, the present invention provides a rotary valve 1 to feed artificial snow at a constant rate in relation to one of the first to third aspects in which ring grooves 19 are formed at both ends of the impeller rotary shaft, wherein ring seals are engaged to the ring grooves such that the sections between the ends of the impeller rotary shaft and the side walls of the cylindrical casing are air-tight.

DETAILED DESCRIPTION OF THE PREFERRED EMBODIMENTS

Figure 1:
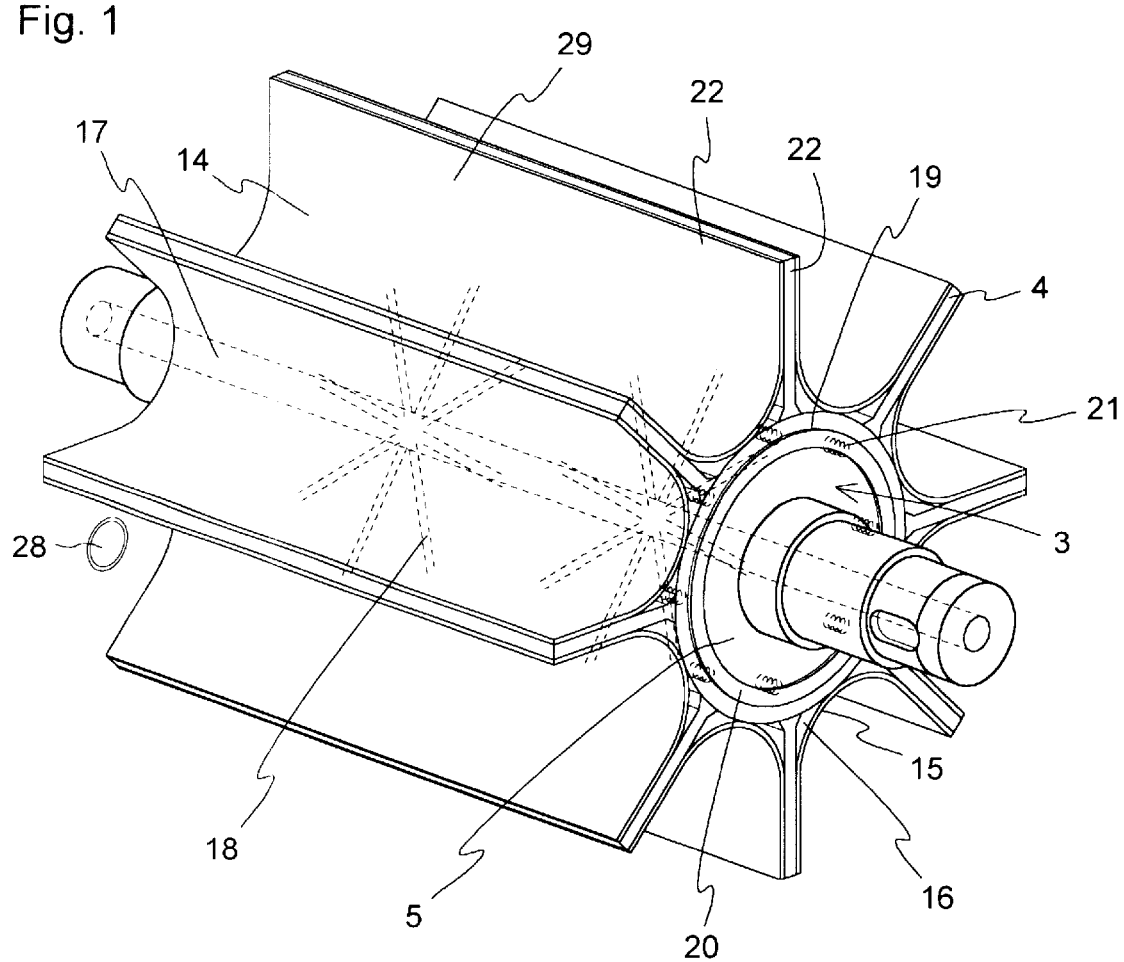
FIG. 1 is an oblique view of impellers and an impeller rotary shaft.
Figure 2:
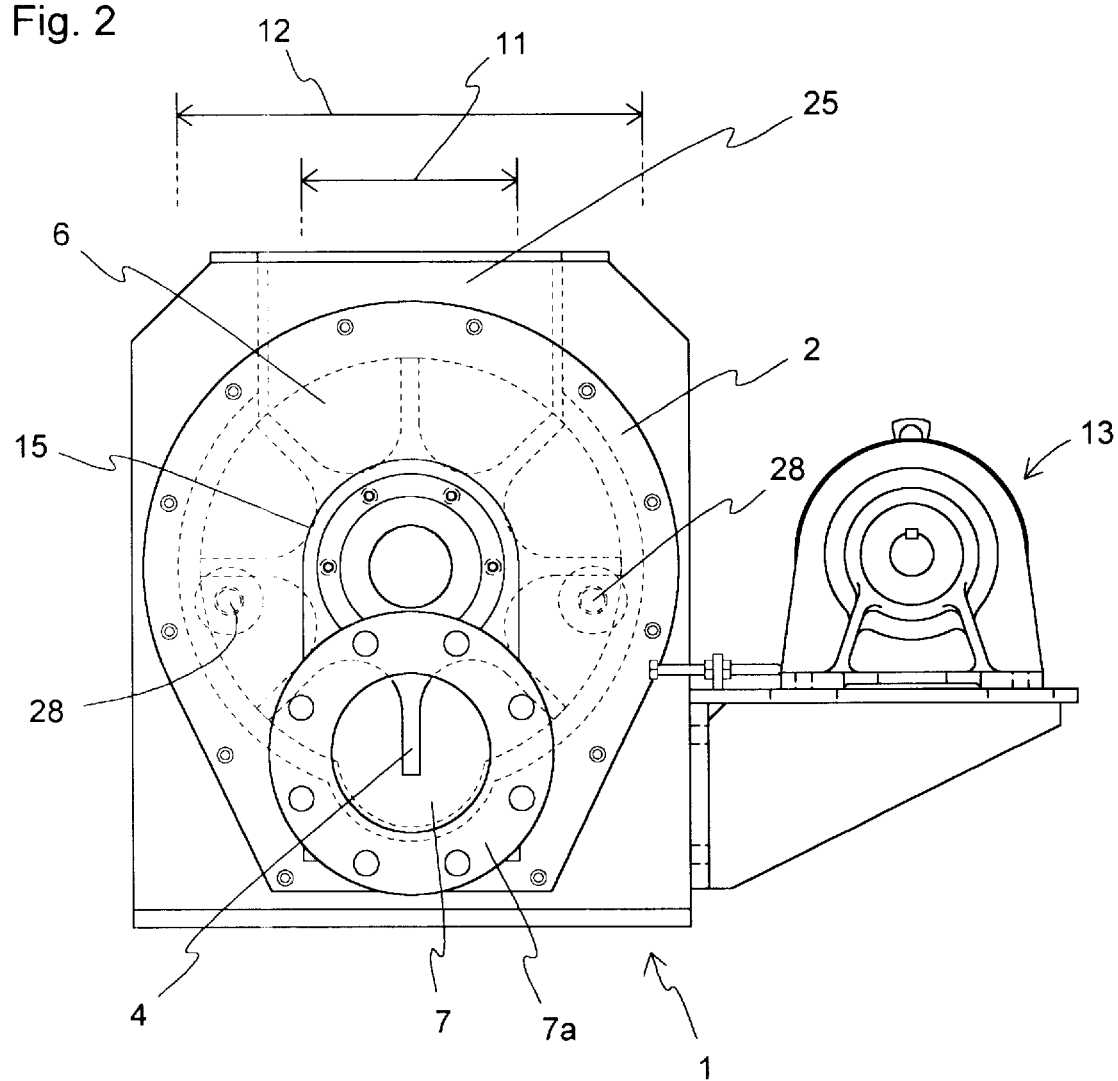
FIG. 2 is a side view of a rotary valve to feed artificial snow at a constant rate.
Figure 3:
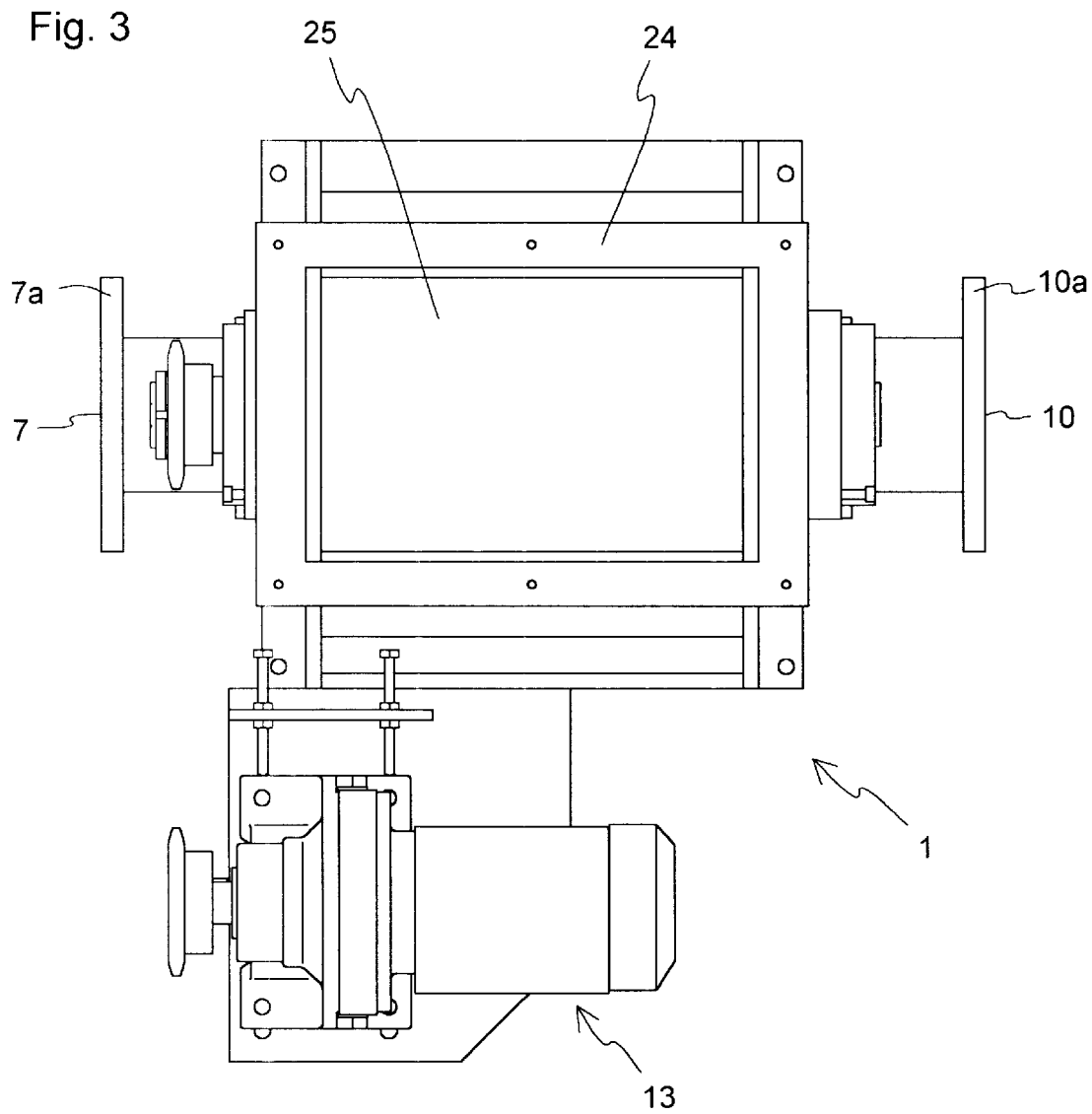
FIG. 3 is a plan view of a rotary valve to feed artificial snow at a constant rate.
Figure 4:
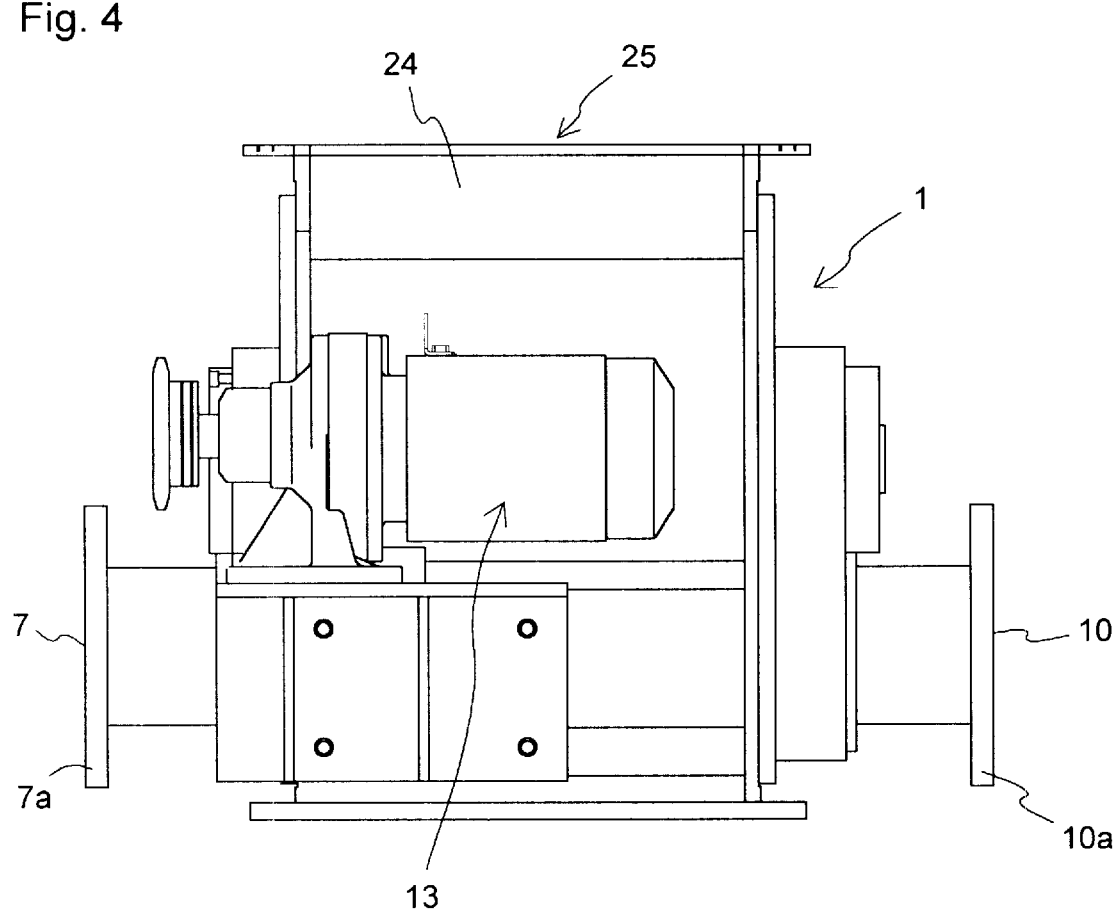
FIG. 4 is a front view of a rotary valve to feed artificial snow at a constant rate.
Figure 5:
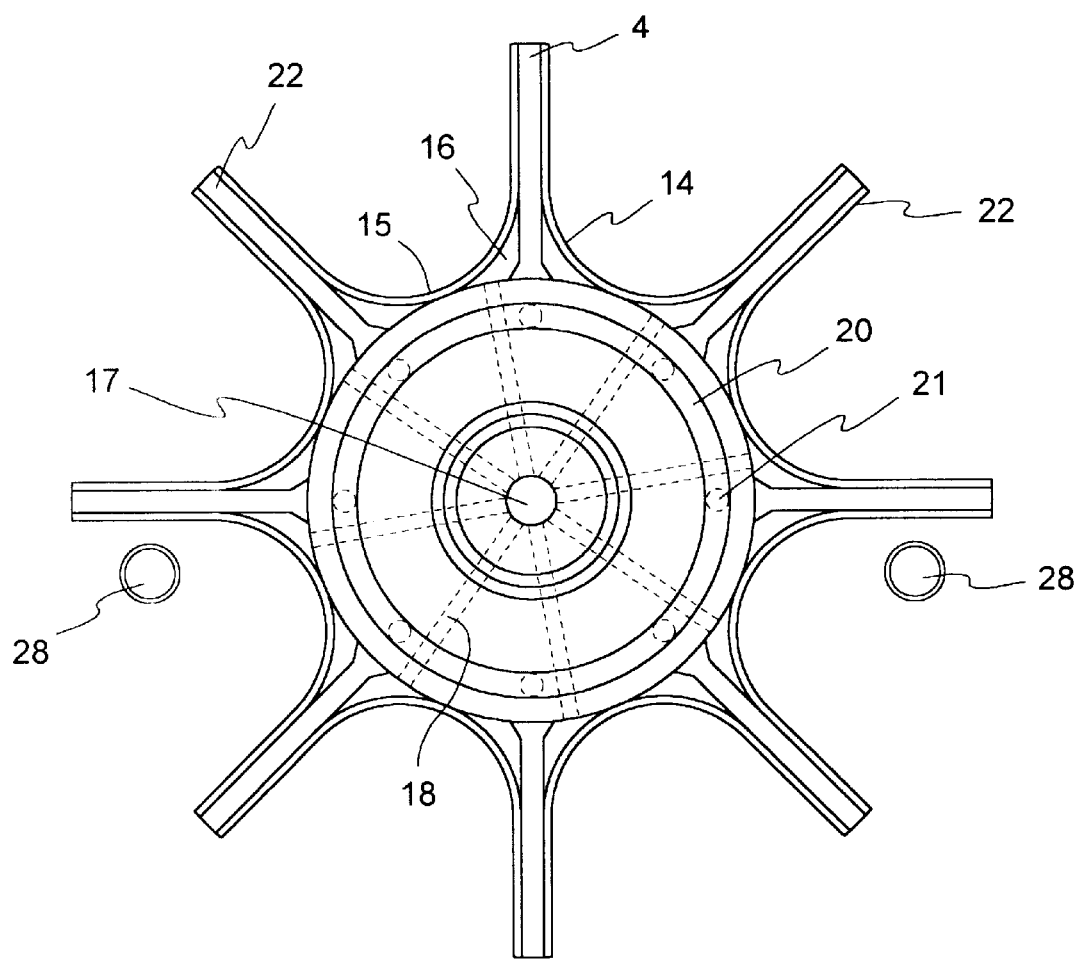
FIG. 5 is a view of the impellers and the impeller rotary shaft from the end of the shaft.
Figure 6:
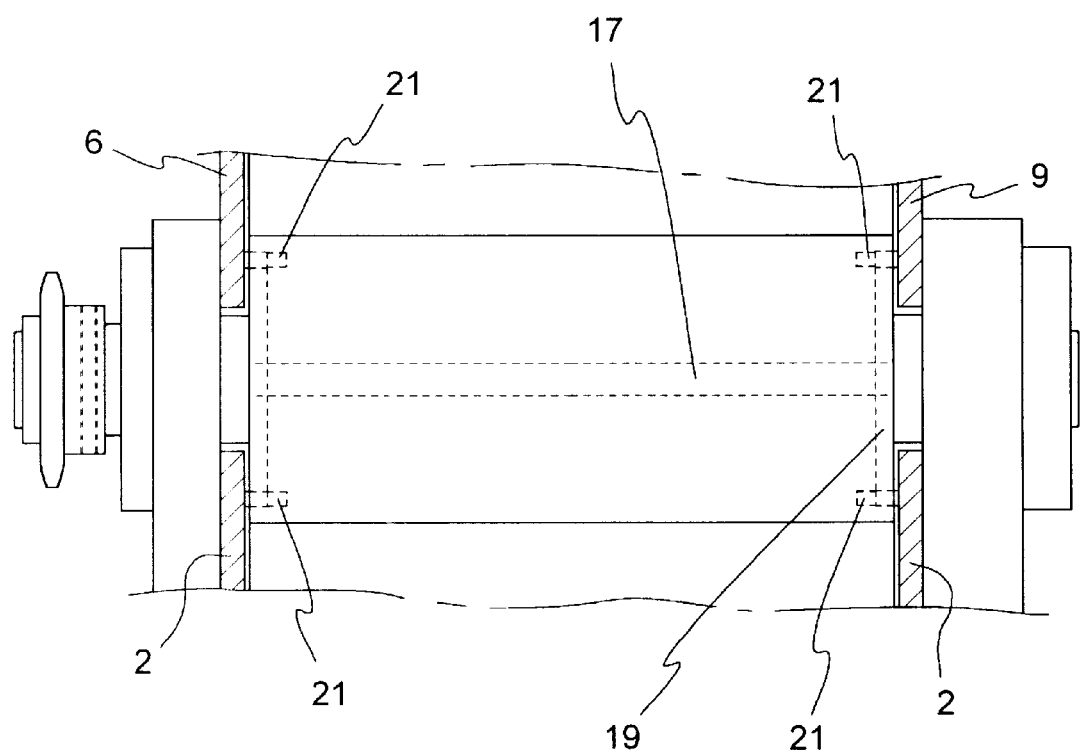
FIG. 6 is a partial cross section to show mounting of the impeller rotary shaft to a casing.
Figure 7:
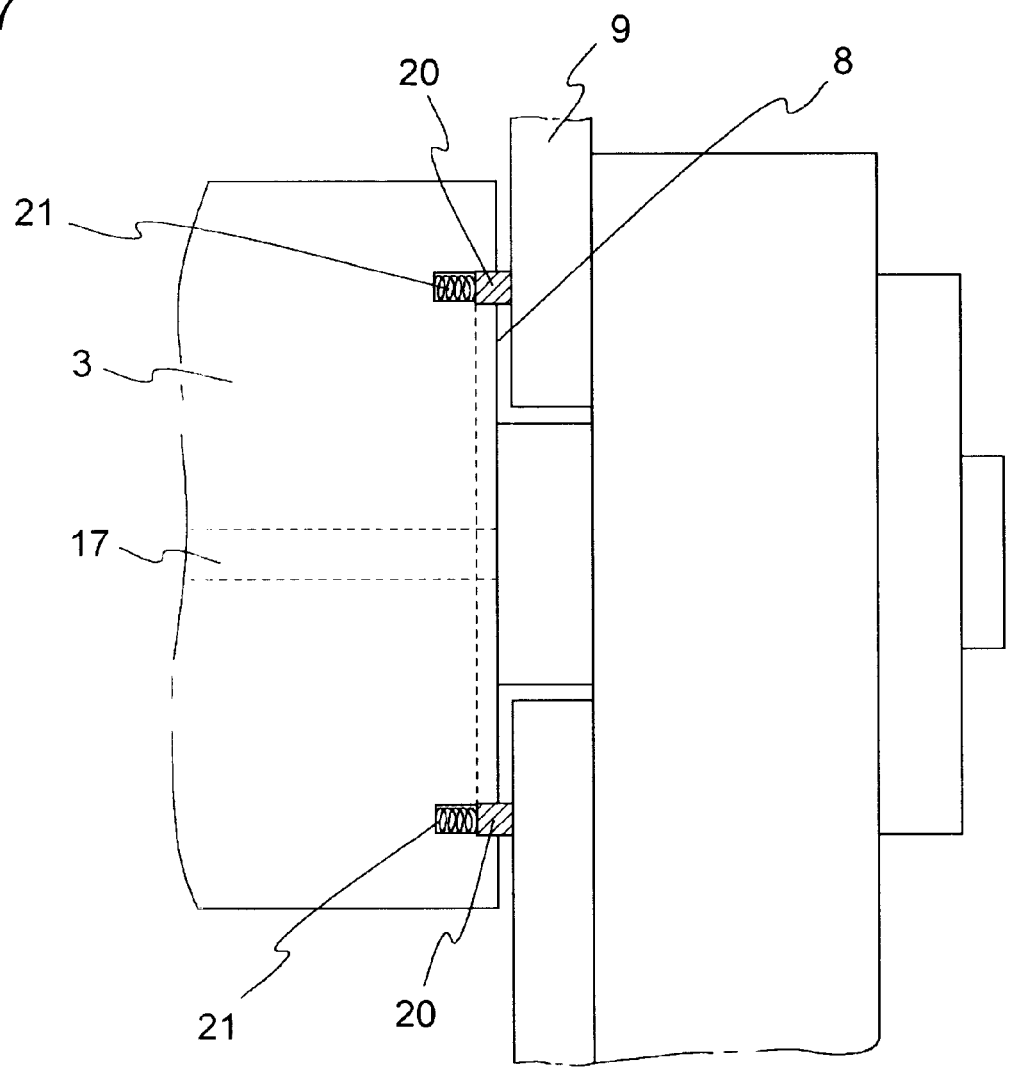
FIG. 7 is a partially enlarged view of the mounting of the impeller rotary shaft to the casing.
Figure 8:
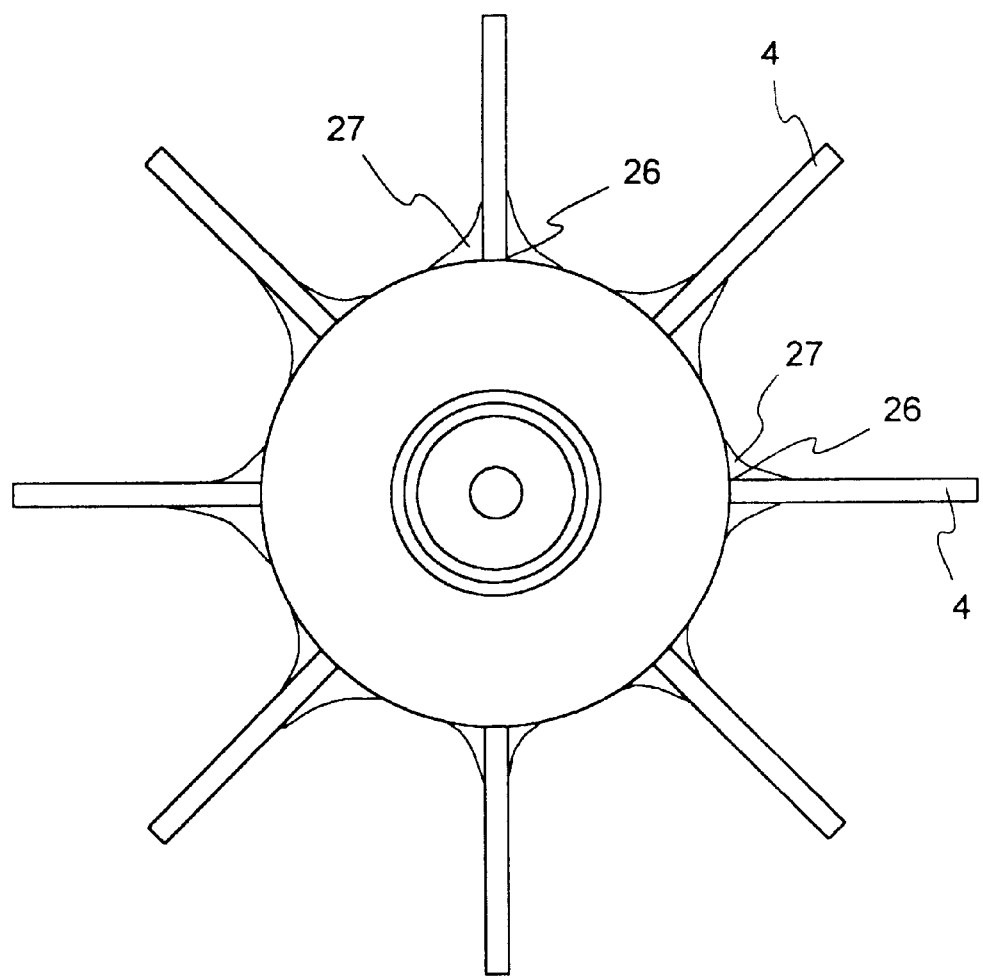
FIG. 8 is a drawing to show how ice adheres to an impeller rotary shaft and impeller corner portions of conventional technology.

Embodiments of the present invention will be described with reference to the drawings. FIG. 1 is an oblique view of the impellers and an impeller rotary shaft of a rotary valve to feed artificial snow at a constant rate according to the present invention. FIG. 2 is a side view of the rotary valve to feed artificial snow at a constant rate. FIG. 3 is a plan view and FIG. 4 is a front view of the above. FIG. 5 shows the impellers and the impeller rotary shaft viewed from the end of the shaft. FIG. 6 is a partial cross section to show how the impeller rotary shaft is mounted to a casing by removing an arched plate. FIG. 7 is a partially enlarged figure of FIG. 6.

A rotary valve 1 to feed artificial snow of the present invention in a first embodiment of the present invention includes a cylindrical casing 2 in housing 24;

an impeller rotary shaft 3 which is placed in cylindrical casing 2 in the length direction of the cylinder;

a plurality of impellers 4 which are arranged around impeller rotary shaft 3 at an equal distance from each other in the radial direction;

an opening 25 for loading of artificial snow which has holes formed at the top portion of cylindrical casing 2 and the top portion of housing 24 to load separately made artificial snow including plate snow, flake snow and powder snow;

an opening 7 for receiving compressed air which has flange 7a for assembly of a supply pipe on casing side wall 6 on the side of one end 5 of impeller shaft 3 to receive compressed air from a blower; and an exit 10 for artificial snow which has flange 10a for assembly of a supply pipe on casing side wall 9 on the side of the other end 8 of the shaft to blow out the artificial snow at a constant rate.

The diameter 11 of impeller shaft 3 is established to be one half of the diameter 12 of cylindrical casing 2. For example, a 150-ton (300,000 lbs) rotary valve 1 to feed artificial snow at a constant, the diameter 12 of casing 2 is established to be 370 mm while the diameter 11 of impeller shaft 3 is 180 mm. Impeller rotary shaft 3 is supported such that it may rotate in a bearing at one end of casing side wall 6 and the other end of casing side wall 9. Additionally, impeller rotary shaft 3 is driven by the rotation of a timing belt (not shown) with motor 13 which is placed on the side of rotary valve 1. A plurality of impellers, e.g., eight, is arranged around impeller rotary shaft 3 at an equal distance in the radial direction and reaches the inner wall of the casing. The side of impellers 4, that is the distance between one end of impeller 4 to one end of another impeller 4 which extends to the opposite side of impeller rotary shaft 3, is established to be 370 mm, for example. Further, the length of impeller rotary shaft 3 in the axial direction, from one end 5 to the other end 8 of impeller rotary shaft 3, is established to be, for example, 400 mm.

In the above configuration, impeller 4 is connected with the adjacent impeller at its end contacting impeller rotary shaft 3 by a smooth surface of arched plate 14 having an arc. An opening 7 for receiving compressed air on casing side wall 6 and an exit 10 for artificial snow on the other casing side wall 9 are arranged across from each other in arc 15 between adjacent impellers 4 and 4. An opening 7 for receiving compressed air and an exit 10 for artificial snow are formed on casing side walls 6 and 9, respectively, such that artificial snow on the arc is moved straight by being pushed by the compressed air from opening 7 and blown out from exit 10. Additionally, a hole 28 for removing remaining pressure is formed at the middle positions on casing side walls 6 and 9 which are deviated from opening 7 for receiving compressed air and exit 10 for artificial snow. Unlike a conventional apparatus, impellers 4 are covered with an arched plate 14 having arc 15 in the first embodiment. In other words, impeller 4 is connected with the adjacent impeller with a smooth surface, without a corner portion at the base of impeller 4 contacting impeller rotary shaft 3. Therefore, there is no space for artificial snow to get caught and thereby freeze. Consequently, problems caused by frozen artificial snow can be dramatically reduced by the rotary valve 1 to feed artificial snow at a constant rate.

In a second embodiment of the present invention, the rotary valve which feeds artificial snow at a constant rate has an arched plate 14 having arc 15 which has coating layer 29 of a lubricating resin, e.g. poly tetrafluoroethylene resin (commercial name: Teflon), with outstanding lubricity. Hence, artificial snow can be readily moved thereon to prevent adhesion.

In a third embodiment of the present invention, the rotary valve which feeds artificial snow at a constant rate includes a hollow portion 16 on sides of impeller 4 between impeller rotary shaft 3 and arched plate 14 having arc 15. In other words, hollow portion 16 extends from one end 5 to the other end 8 of impeller rotary shaft 3 on the periphery of the shaft along the both sides of impeller 4. The space is sealed at ends 5 and 8. Further, heater hole 17, with a diameter of 20 mm, for example, is formed at the center of impeller rotary shaft 3, and heater 18, of 200 watts, for example, is placed therein. Heater hole 17 and each hollow portion 16 are connected to each other by a plurality of thermal convection holes 18, which are formed around heater hole 17 in the radial direction, to lead the heat from heater hole 17 to each hollow portion 16.

According to the above configuration, arched plate 14 is heated from the inside such that artificial snow does not adhere to arched plate 14 or impeller 4. Insertion of the heater in heater hole 17 is necessary with an apparatus to feed artificial snow with fine ice pieces, such as flake snow and powder snow. In the case of plate snow, the insertion of the heater is not necessary as the plate snow hardly adheres to the surface of the apparatus.

In a fourth embodiment of the present invention, the rotary valve which feeds artificial snow at a constant rate has ring grooves 19, with a diameter of 160 mm, for example, formed on ends 5 and 8 of impeller rotary shaft 3. Ring seals 20 of nylon and the like are placed in ring grooves 19 such that the top surface of ring seals 20 is slightly projected from shaft ends 5 and 8. Spring coil 21 is placed at an appropriate position of ring groove 19 under ring seal 20 to push up ring seal 20. As a result, both ends 5 and 8 of impeller rotary shaft 3 have an air-tight seal against side walls 6 and 9 of cylindrical casing 2. Edge 22 of impeller 4 is brought as close as possible to the inside of cylindrical wall 23 and casing side walls 6 and 9 to minimize a leak from the space therein. As a result, air, which is blown from a blower via opening 7 for receiving compressed air, is prevented from leaking out from the casing through cylindrical wall 23, casing side walls 6 and 9 or the shaft such that the air is completely blown out from the exit for artificial snow. Consequently, artificial snow can be efficiently fed at a constant rate.

According to the above apparatus, at a rate of 7.5 tons per hour, for example, artificial snow is loaded from opening 25 for loading of artificial snow, at the top of housing 24, to arc 15 of arched plate 14 on impeller rotary shaft 3, which is now located at the top of cylindrical wall 23 of the casing with rotation, via the top of cylindrical wall 23 of cylindrical casing 2. Artificial snow is then placed in each arc 15 which is located thereat successively as impeller 4 rotates. Accordingly, arc 15 of arched plate 14 on impeller rotary shaft 3 rotates downward while holding artificial snow therein until the position of arc 15 overlaps the position of the opening 7 for receiving compressed air and the exit 10 for artificial snow. Once that happens, artificial snow is blown out from exit 10 with compressed air from opening 7 at the air pressure of 0.4 kg/cm$^2$ or 392,000 Pa. Herein, the remaining pressure of the air in arc 15 is removed through hole 28 for removing remaining pressure which is at a position where arc 15 is moving upward halfway as impeller rotary shaft 3 slightly rotates. As a result, the remaining pressure therein is not withheld until arc 15 returns to the top position to burst out such that artificial snow can be loaded therein. Motor 13 to rotate impeller rotary shaft 3 is of 1.5 kw and 200V, and impeller rotary shaft 3 rotates at 30 rpm.

As described above, artificial snow is fed after being cut into a given amount with a constant air pressure and a constant rotational speed. Therefore, the artificial snow is not excessively compressed, thereby permitting quality artificial snow to be efficiently fed at a constant rate.

EFFECTS

According to the rotary valve to feed artificial snow at a constant rate of the present invention, the impeller is connected to the adjacent impeller with a smooth surface by the arched plate having the arc such that no corner portion is formed between the impeller and the impeller rotary shaft. Therefore, fine artificial snow is less likely to adhere thereon. This tendency is even further significant with the use of the lubricating coating layer. Moreover, when heat is conducted from the heater at the center of the impeller rotary shaft to the hollow portion inside the arched plate, it is extremely difficult for artificial snow to adhere onto the heated impeller as it thaws thereon. Therefore, the present invention prevents artificial snow from adhesion, growth, and freezing, which reduces the feeding space. Therefore, a problem such as suspended rotation of the rotary valve can be prevented. Additionally, ends of the impeller rotary shaft and the casing side walls are air-tight such that the pressure of the air sent from the blower does not escape. As a result, fine artificial snow is efficiently fed at a constant rate. The present invention provides excellent effects which are not found with the conventional technology.

What is claimed is:

1. A rotary valve to feed artificial snow at a constant rate comprising:
   a cylindrical casing;
   an impeller rotary shaft which is placed in said cylindrical casing along the length direction of the cylinder;
   a plurality of impellers which are arranged around said impeller rotary shaft at an equal distance from each other in the radial direction;
   a housing which supports said cylindrical casing therein;
   an opening for loading of artificial snow, which connects the top portion of a wall of said cylindrical casing with the top portion of said housing;
   an opening for receiving compressed air, which is formed on the side wall of said casing at one end of said impeller rotary shaft to receive said compressed air from a blower; and
   an exit for artificial snow, which is formed on the other end of said casing wall to blow out artificial snow cut in a given amount with compressed air,
   wherein the diameter of said impeller rotary shaft is established to be about one half of the diameter of said cylindrical casing,
   wherein said impeller is connected with the adjacent impeller at its end contacting said impeller rotary shaft by a smooth surface of an arched plate having an arc; and
   wherein said opening for receiving compressed air on one end of the side wall of said casing and said exit for artificial snow on the other end of the side wall of said casing are arranged across from each other in said arc between said impellers.

2. The rotary valve to feed artificial snow at a constant rate according to claim 1, wherein said arched plate having said arc is covered by a lubricating resin coating layer.

3. The rotary valve to feed artificial snow at a constant rate according to claim 2,
   wherein hollow portions are formed on two sides of said impeller between said arched plate having said arc and said impeller rotary shaft,
   wherein a heater is placed in a heater hole at the center of said impeller rotary shaft in the axial direction, and
   wherein said heater hole and each of said hollow portions are connected via a plurality of thermal convection holes which are formed in the radial direction to send the heat from said heater hole to each hollow portion.

4. The rotary valve to feed artificial snow at a constant rate according to one of claim 2,
   wherein ring grooves are formed at both ends of said impeller rotary shaft, and
   ring seals are engaged to said ring grooves so as to airtightly seal the sections between the ends of said impeller rotary shaft and the side walls of said cylindrical casing.

5. The rotary valve to feed artificial snow at a constant rate according to claim 1,
   wherein hollow portions are formed on two sides of said impeller between said arched plate having said arc and said impeller rotary shaft,
   wherein a heater is placed in a heater hole at the center of said impeller rotary shaft in the axial direction, and
   wherein said heater hole and each of said hollow portions are connected via a plurality of thermal convection holes which are formed in the radial direction to send the heat from said heater hole to each hollow portion.

6. The rotary valve to feed artificial snow at a constant rate according to one of claim 5,
   wherein ring grooves are formed at both ends of said impeller rotary shaft, and
   ring seals are engaged to said ring grooves so as to airtightly seal the sections between the ends of said impeller rotary shaft and the side walls of said cylindrical casing.

7. The rotary valve to feed artificial snow at a constant rate according to one of claim 1,
   wherein ring grooves are formed at both ends of said impeller rotary shaft, and
   ring seals are engaged to said ring grooves so as to airtightly seal the sections between the ends of said impeller rotary shaft and the side walls of said cylindrical casing.

* * * * *